United States Patent
Herring

(10) Patent No.: US 6,652,404 B2
(45) Date of Patent: Nov. 25, 2003

(54) DEVICE FOR ASSEMBLING A PUSH V-BELT

(75) Inventor: Christopher Herring, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/008,197

(22) Filed: Nov. 8, 2001

(65) Prior Publication Data

US 2002/0088115 A1 Jul. 11, 2002

(30) Foreign Application Priority Data

Nov. 15, 2000 (DE) .......................... 100 56 577

(51) Int. Cl.$^7$ .............................. F16G 1/00; B23P 21/00
(52) U.S. Cl. ...................... 474/242; 474/273; 474/201; 29/790; 29/760
(58) Field of Search .................... 29/790, 760, 892, 29/809, 822, 771; 474/242, 201, 139, 244, 273

(56) References Cited

U.S. PATENT DOCUMENTS

| 4,618,337 A | * | 10/1986 | Okawa et al. | ............... 474/201 |
| 4,773,896 A | * | 9/1988 | Bouteiller et al. | ........... 474/242 |
| 5,690,573 A | * | 11/1997 | Sato et al. | ..................... 29/809 |

FOREIGN PATENT DOCUMENTS

| DE | 42 30 605 C1 | 8/1993 | ............. F16H/9/24 |
| DE | 197 34 839 A1 | 8/1999 | ........... F16H/63/30 |
| EP | 0 279 473 A1 | 8/1988 | ............. F16G/5/16 |
| EP | 1178240 A2 | * 2/2002 | |
| JP | 2000-205344 A | * 7/2000 | |
| JP | 2000-205345 A | * 7/2000 | |
| JP | 2001-138149 A | * 5/2001 | |

* cited by examiner

*Primary Examiner*—Marcus Charles
(74) *Attorney, Agent, or Firm*—Davis & Bujold, PLLC

(57) ABSTRACT

The device for assembling a push V-belt for a continuously variable automatic transmission wherein the push V-belt consists of a plurality of push elements (1) movably interconnected that form an endless belt and of two ring sets (2, 2') has a centering ring (3) for lodging the first ring set (2) and fixing the individual push elements (1) and a circular ring (4) upon the lodged push V-belt and externally partly surrounding it, the ring having an inner outline adapted to the appertaining outer outline of the push V-belt so that a radial force acts upon each individual push element (1) in direction to the axle that traverses perpendicularly to the radial plane the central point of the circle formed by the push V-belt.

6 Claims, 4 Drawing Sheets

DEVICE FOR ASSEMBLING A PUSH V-BELT

FIELD OF THE INVENTION

This invention relates to a device for assembly a push V-belt for a continuously variable automatic transmission, in particular for motor vehicles.

BACKGROUND OF THE INVENTION

Continuously variable transmission, also called CVT, have a first beveled pulley pair upon a drive shaft and a second beveled pulley pair upon an output shaft. Each beveled pulley pair consists of one first stationary pulley in the axial direction and one second beveled movable pulley in axial direction also called primary and secondary pulley. Between the pairs of beveled pulleys extends an endless drive chain called a push V-belt. The primary and secondary pulleys are adjusted by a pressure medium. To this end, via electromagnetic actuators and hydraulic valves, an electronic control unit controls the pressure level of the adjustment spaces of primary and secondary pulleys.

One example of a continuously variable automatic transmission, having a push V-belt, is described in the Applicant's DE-A 197 34 839. The automatic transmission has a multi-disk clutch and a push V-belt guided upon a pulley set firmly connected with a primary shaft wherein the multi-disk clutch is a disk set with inner disks and outer disks and wherein the inner disks are guided in an inner disk carrier and the outer disks in an outer disk carrier and wherein the disk set can be compressed by one piston. The adjustment of diameter of the corresponding beveled pulleys and the pressurizing of a starting clutch results by means of hydraulic actuating cylinders; the pressures prevailing therein are adjusted by a hydraulic control unit which provides that the push V-belt is prestressed according to the existing engine torque in a manner such that a reliable force transmission occurs without slipping of the push V-belt.

One example of a push V-belt for such CVT transmissions is described in DE-B 42 30 606. This known push V-belt consists of light, long, thick bolts and bearings with smooth cylindrical surfaces and wedge-shaped abrasion-resistant side surfaces with flattened medium edge surfaces made of plastic reinforced with glass fiber of great compressible resistance or of steel tubing with side wedge bodies of plastic, the same as of two wide, outer, flexible, plastic belts reinforced with glass fiber having high tensile strength and of two inner, wide, elastic, thin steel belts. Due to the multiplicity of plastic parts the known push V-belt is still subject to relatively great wear.

Therefore, there are used for powerful engines push V-belts consisting of a plurality of individual metal elements which are assembled and each held upon both sides of the radial plane of the finished push V-belt by an elastically deformable ring set. The ring sets can be made of fine steel and each advantageously has twelve rings disposed concentrically to each other. A push V-belt for one of the CVT transmissions manufactured by the Applicant consists of about 380 elements and of two ring sets each comprising twelve rings.

Until now it has been customary to manually plug the individual elements on one of the ring sets and then, likewise, to manually insert the second ring set in the corresponding groove resulting from the shape of the individual elements.

Especially during the test assembly, the individual elements and the rings of the ring sets are measured for new assemblies, intermediate inspections and final inspections so that the push V-belts has to be disassembled. The assembly and disassembly of the ring sets require the greatest care and highest possible cleanliness in order to keep from damaging the rings of the ring sets. A scratch or even a flaw practically represents a preset breaking point which can later result in failure during use of the transmission.

The problem on which this invention is based is to provide a device for assembly of a push V-belt for a continuously variable transmission with which damage to the rings can be prevented with certainty and with which the assembly of the push V-belt can be carried out considerably quickly.

SUMMARY OF THE INVENTION

According to the invention, it is proposed that the device has a circular retaining pulley for centering the first ring set and for lodging the push elements, the same as a ring superposable upon the placed push element and having its inner outline adapted to the outer outline of the push elements so that a force directed radially toward the axis through the central point of the circle formed by the placed push elements acts upon the push elements so that the second ring set can be inserted without action of force in the groove available in the push V-belt.

Damage to the individual rings of the ring set, due to scratch or flaws, is thus eliminated, since by adequate dimensioning of the superposable ring the take-up groove for the ring set corresponds exactly to the circular diameter of the ring set in unloaded state. By exerting light manual force upon the superposed ring, all push elements are simultaneously pressed inwardly within the force acting upon the first lower ring set and so that the second upper ring set can be inserted almost by itself in the groove available in the push V-belt.

BRIEF DESCRIPTION OF THE DRAWINGS

The invention will now be described, by way of example, with reference to the accompanying drawings in which.

DETAILED DESCRIPTION OF THE INVENTION

The push V-belt conventionally consists of a plurality of individual push elements 1, about 383 individual push elements in the case of a push V-belt intended for a CVT transmission. The individual push elements, the cross-section of which is shown in FIGS. 1 to 3, are provided with two opposite grooves for lodging ring sets 2 and 2' which consist of twelve elastically deformable rings fitted into one another.

Both for the new assembly and for the intermediate inspections and final inspections, the push V-belt must now be disassembled and measured. Especially in the installation and removal of the ring sets 2 and 2', the greatest care and accuracy are required in order to protect the individual rings from damage, i.e. scratches, since these practically represent a set breaking point which can result in failure.

Figure 1:
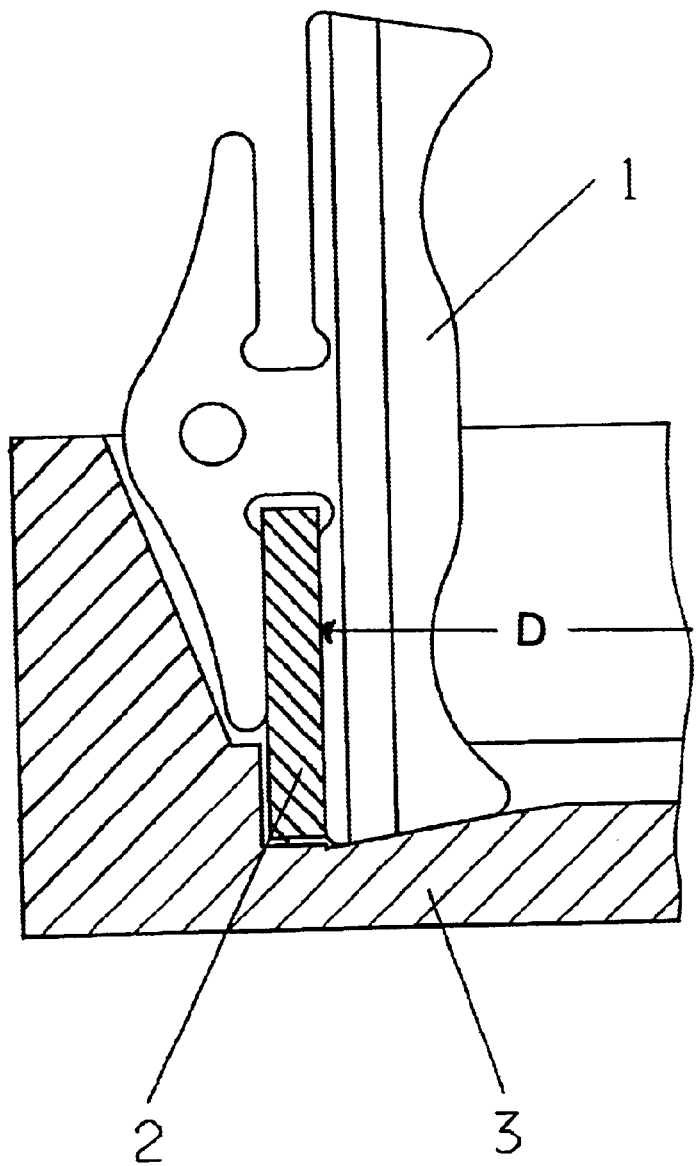
FIG. 1 is the assembly step of the insertion of the first ring set.

In order to be able to introduce the ring sets free of damage and without use of force in the grooves of the assembled individual push elements 1, in FIG. 1, there is provided a centering ring 3 which centers the first ring set 2 in order to accommodate and to fix the individual push elements 1. As it can, therefore, be understood from FIG. 1, the first ring set 2 is inserted in the device for centering after which the individual push elements 1 can be guided consecutively via the first ring set 2. The end play of the finished push V-belt of about 0.1 to 0.6 mm is here adjusted via thin push elements. The need of precise centering of the ring set when it is assembled is made clear.

Figure 2:
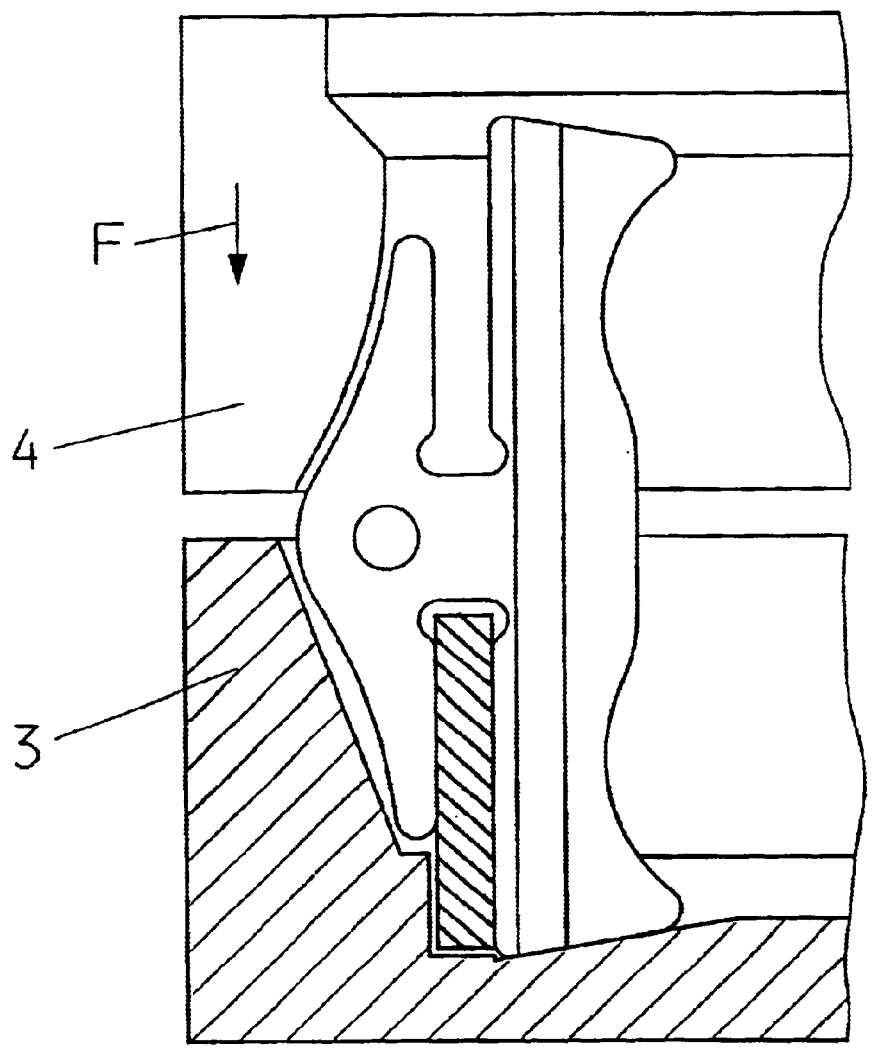
FIG. 2 is the assembly step of addition of the ring serving as insertion aid.
Figure 3:
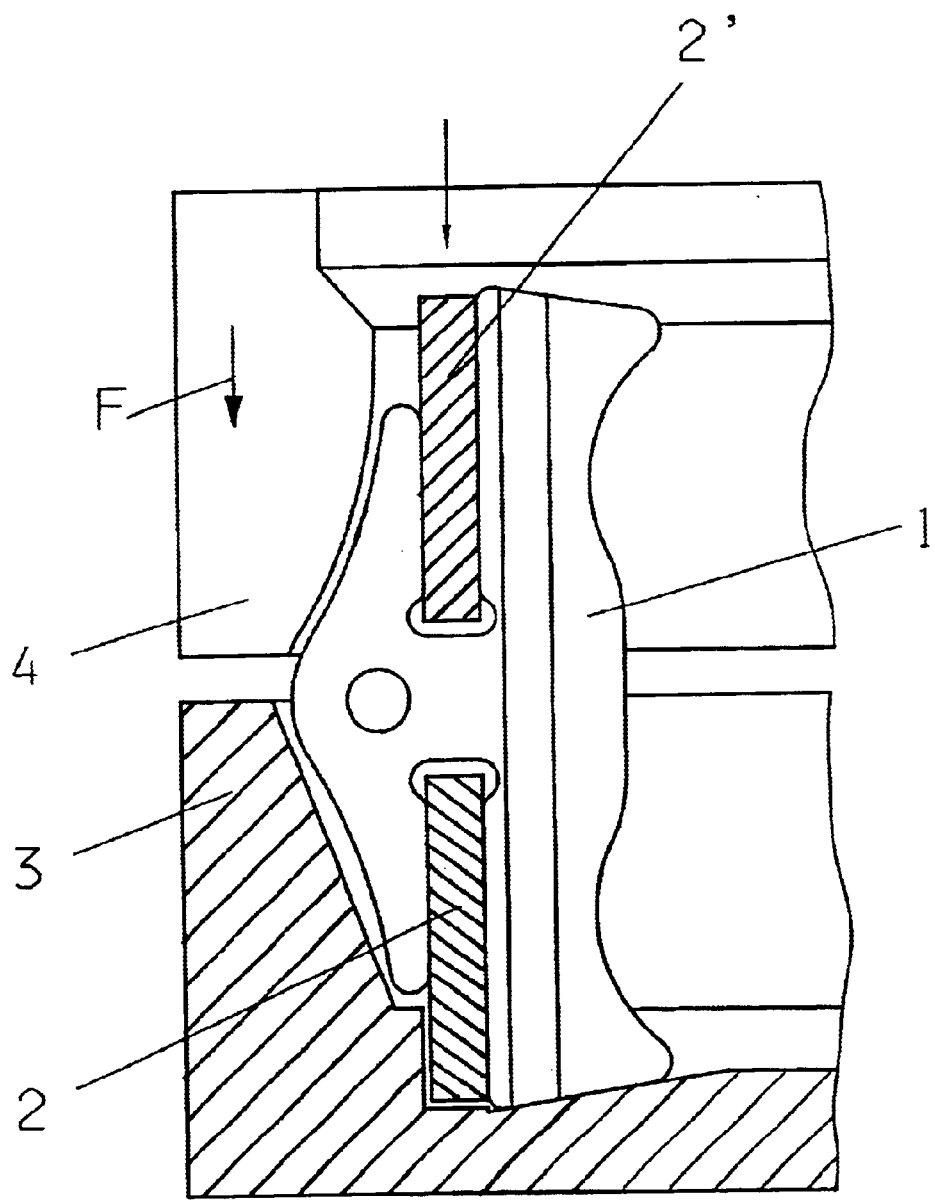
FIG. 3 is the assembly step of insertion of the second ring set.

Upon the assembly push elements 1 of the still incomplete push V-belt, there is superposed a circular ring 4, shown in FIG. 2, which partially surrounds the push V-belt externally. The inner outline of the ring 4 serving as insertion aid is adapted to the appertaining outer outline of the push V-belt so that the ring 4 exerts on the push V-belt a radial force F in direction of the axis that traverses perpendicularly to the radial plane the central point of the circle formed by the push V-belt so that the ring set circular in an unloaded state can be inserted without action of force in the circularly shaped groove formed thereby in the push V-belt. Therefore, due to the force F exerted upon the ring 4, all push elements 1 are simultaneously pressed inwardly, the force being exerted not upon the lower ring set but exclusively upon the push element 1.

According to FIG. 3, the second ring set 2' can now be easily inserted in the groove in the push elements after which the ring 4 can again be removed.

Figure 4:
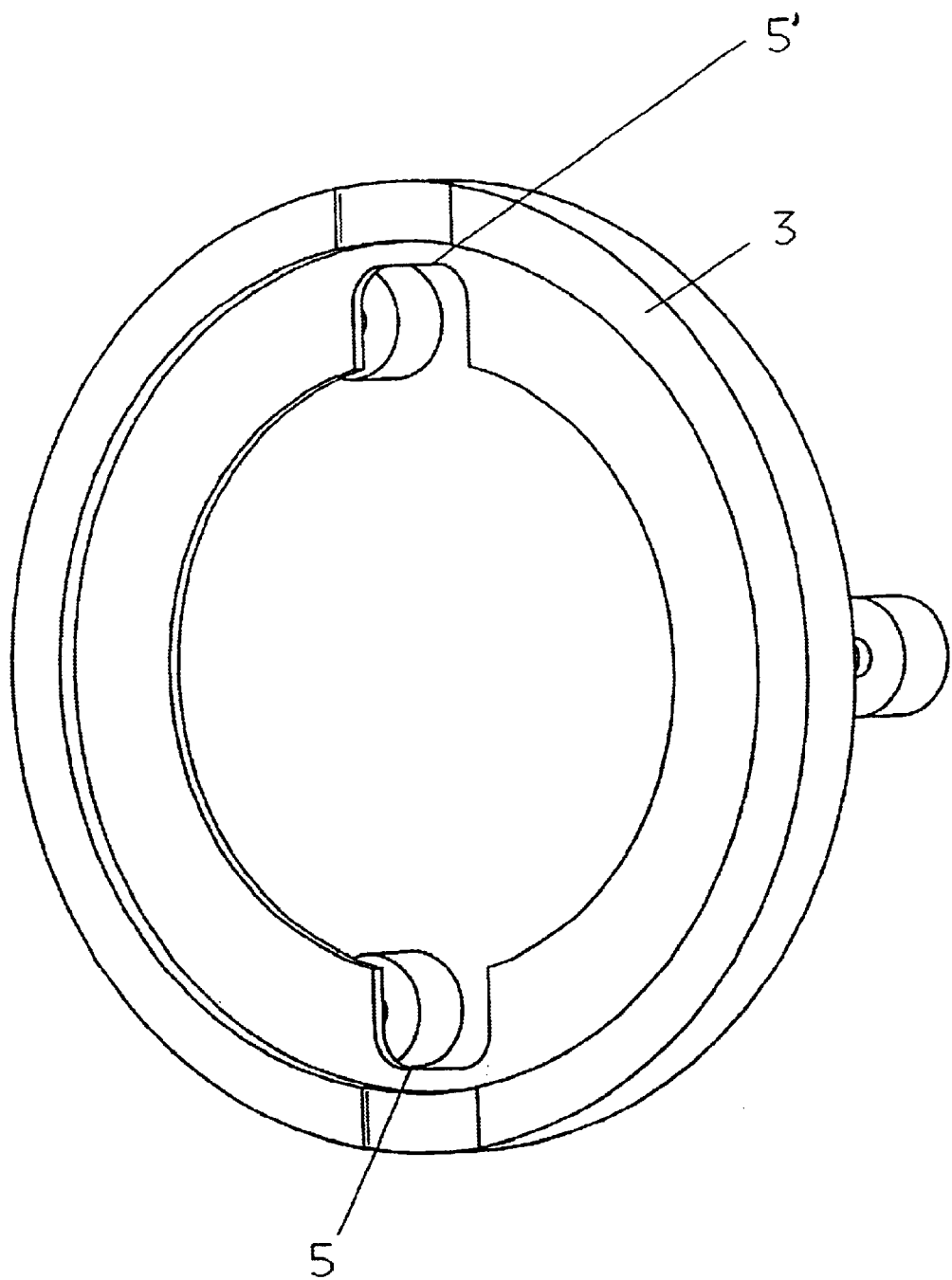
FIG. 4 is a perspective representation of the centering ring.

After insertion of the ring set 2' in the push V-belt, the ring 4 is removed and the belt, now completely assembled, lifted from the centering ring 3. In order to easily be able to carry this out, two recesses 5, 5' are provided in the interior of the centering ring 3, as shown in FIG. 4, so that the belt can be engaged below the lower ring set and cannot disintegrate.

For example, the inner diameter D of a ring set 2 adequate for a motor vehicle transmission, amounts in a typical case of use to about 220 mm. A typical thickness for one of the push elements 1 is about 1.8 mm. The total play for the whole width typically amounts to from 0.1 to 0.5 mm.

| Reference Numerals | |
|---|---|
| 1 | push elements |
| 2, 2' | ring set |
| 3 | centering ring |
| 4 | ring |
| 5, 5' | recess |

What is claimed is:

1. A device for assembling a push V-belt for a continuously variable automatic transmission, the push V-belt comprising a plurality of movably interconnected push elements (1) form an endless belt and two ring sets (2, 2') which are inserted in said push V-belt symmetrically relative to a radial plane thereof, wherein a circular centering ring (3) for loosely lodging the first ring set (2) and fixing the individual push elements (1) and by a circular ring (4) that externally surrounds a lodged push element and whose inner outline is adapted to an appertaining outer outline of the push V-belt so as to exert upon each individual push element (1) a radial force F in a direction of an axis that traverses perpendicularly to a radial plane the central point of the circle formed by the push V-belt so that a second circular ring (2') can be inserted without action of force in a groove formed thereby.

2. The device according to claim 1, wherein said centering ring is provided with a circular collar having an external diameter smaller than an internal diameter of the push V-belt to be lodged.

3. A device for assembling a push V-belt for a continuously variable automatic transmission, the push V-belt comprising a plurality of push elements (1) that, when connected with one another, are movable relative to one another and form an endless belt, and each one of the plurality of push elements (1) being interconnected with one another by two ring sets (2, 2') which are symmetrically inserted in the push V-belt relative to a radial plane of the plurality of push elements (1);

wherein a first centering ring (3) receives the first ring set (2) and connects the first ring set (2) with the plurality of push elements (1) due to application of a force (F), in a direction perpendicular to a radial plane defined by the push V-belt, by a second ring (4), and the plurality of push elements (1) receive the second ring set (2') and connect the second ring set (2) with the plurality of push elements (1) due to application of a further force (F), in the direction perpendicular to the radial plane defined by the push V-belt to form a V-shaped endless belt.

4. The device according to claim 3, wherein the first ring (3) is provided with a circular collar having an external diameter smaller than an internal diameter of the V-shaped endless to be formed.

5. The device according to claim 3, wherein the device further comprises two recesses in an interior of the centering ring so the push V-belt can be engaged below a lower ring set.

6. A method for assembling a push V-belt for a continuously variable automatic transmission, wherein the push V-belt comprises a plurality of movably interconnected push elements (1) that form an endless belt and first and second ring sets (2, 2') which are inserted in said push V-belt symmetrically relative to the radial plane thereof, the method comprising the steps of:

lodging the first ring set (2) on a circular centering ring (3);

fixing the plurality of movably interconnected push elements (1) to the first ring set (2) by exerting a force (F), via a circular ring (4), to each of the movably interconnected push elements (1); and inserting the second circular ring set (2') into the movably interconnected push elements (1) by exerting a further force (F) via the circular ring (4) to each of the movably interconnected push elements (1).

* * * * *